Patented Mar. 19, 1946

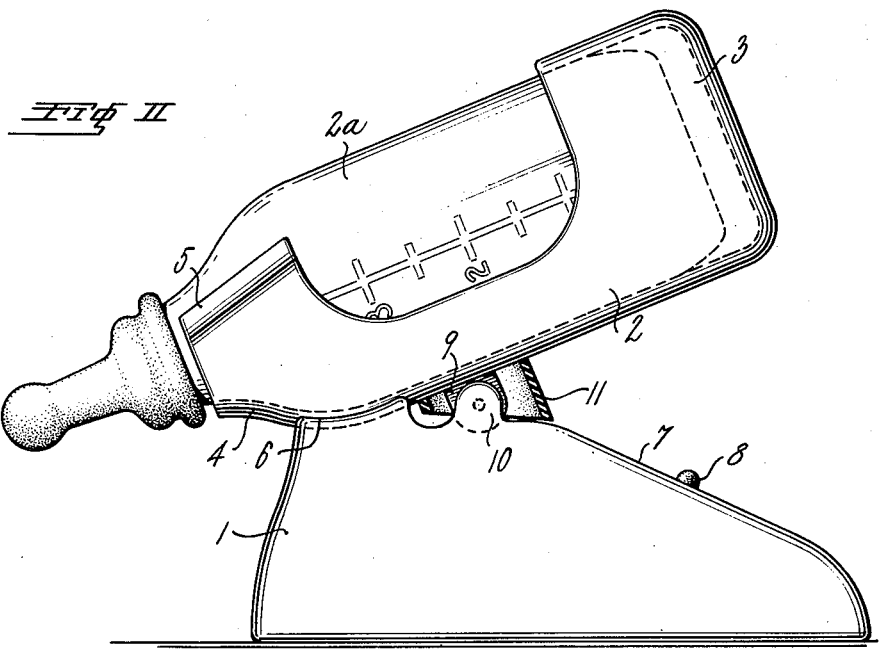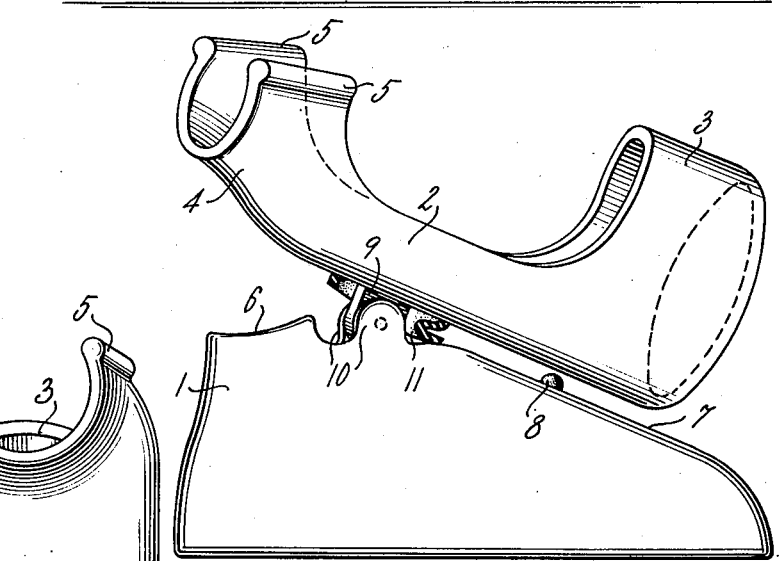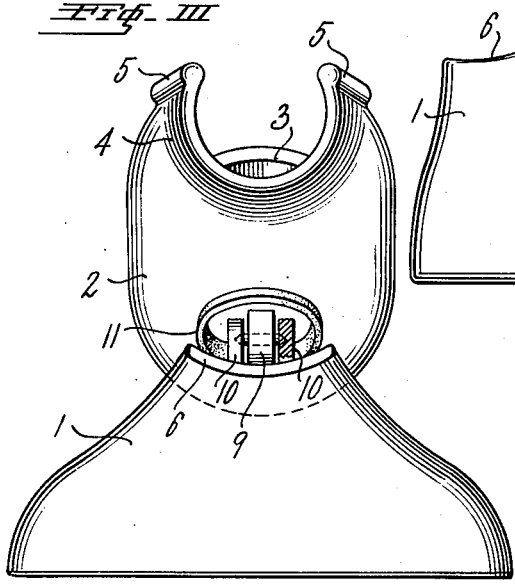

2,397,059

UNITED STATES PATENT OFFICE 2,397,059

BOTTLE HOLDER

Mary E. Swank, New York, N. Y.

Application November 18, 1944, Serial No. 564,035

6 Claims. (Cl. 248—105)

The present invention relates to a holder for a baby's feeding bottle. More particularly, it relates to a holder of this type that is adapted to tip away from the baby when the supply of milk in the bottle is exhausted.

The bottle is especially adapted for use in maternity hospitals where a very large number of babies must be fed, though it is also useful in the home. However, in hospitals, if the babies are to be properly fed, an amount of time of the nurses must be taken up in holding the babies during their meal periods and the nurses are unable to devote this time since, while they are performing this necessary work, they are unable to perform other equally important duties. If the baby is given a bottle in its crib and left unattended, there is a further undesirable possibility that it will exhaust the milk in the bottle and keep on sucking at the nipple, drawing nothing but air. This is a condition which is harmful to the baby's comfort and health.

It is the object of the present invention to provide a bottle holder that, when the bottle is placed in it, can be tipped toward the baby's mouth and the weight of the milk in the bottle will then hold it in position for the baby's use until the milk is exhausted. The bottle holder is balanced on a supporting element in such a manner that when the milk is exhausted both the weight of the holder and the weight of the bottle will tip it away from the baby's mouth so that the baby will no longer continue to suck on the nipple.

Briefly described, the holder of the invention comprises a pedestal or support which comprises a lug on the top portion thereof and a "cradle" or holder proper which is pivoted on the lug. The cradle or holder proper is so balanced on its pivot that, when no bottle is placed in it, it will tip in such a position that it is in the off position—that is, in a position away from the baby's mouth. Similarly, when the bottle is placed in the cradle, the weight of the milk is such that it will remain in this position. However, when the bottle is in place, the device can be set alongside the baby and tipped forward by hand so that the nipple comes down to the baby's mouth. When so tipped, the milk will flow into the upper or forward part of the bottle which will then be held in this position by the weight of the milk. However, as the baby draws the milk from the bottle, the weight in the forward part of the bottle becomes less and when the milk is entirely exhausted the "cradle" with its bottle will tip away from the baby under its own weight.

The invention will be more clearly understood from the drawing in which Fig. I shows the holder in the position it will assume when no bottle is in place or when an empty bottle is in place, i. e., tipped out of operative position; Fig. II represents the holder with a charged bottle in place and tipped into operative position; and Fig. III is a front elevation of the device.

Referring now to Fig. I, 1 is a pedestal or support, 2 is the cradle or holding element. The bottom portion 3 of the cradle is circular in cross-section so as to form a cup or socket to close all around the bottom of the bottle which is pushed into it. The shoulder portion 4 of the cradle is rounded so as to fit somewhat more than half of the shoulder of the bottle below the neck. This neck portion has a lip 5—5 on each side of the open portion and the cradle is made of a somewhat springy material, such as hard rubber, so that the bottle 2ª may be inserted by pushing the bottom of the bottle into the cup or socket 3 and pressing the shoulder of the bottle between the lips 5—5. The shoulder portion of the cradle spreads under pressure to admit the shoulder of the bottle and closes with a light grip around it when it has been pushed into place.

The rounded depression 6 provides a rest conforming to the contour of the shoulder 4 of the cradle when it is tipped forward and a flat rest 7 at the rear of the support accommodates the bottom socket portion 3 of the cradle when the cradle is tipped out of position. A soft bead of rubber or other like material 8 may be provided on the rest 7 so as to prevent the bottom of the cradle 2 from striking too hard against the rest 7. A lug 9 projects downward from the bottom of the cradle and rounded ears 10 affixed to the top of the pedestal or support are pivoted on the lug 9, thus forming a hinge. The lug 9 is positioned somewhat forward of the center of the bottom of the cradle 2 so that the rear or socket portion 3 of the cradle is of somewhat greater weight than the forward or shoulder portion 4 of the cradle and is, therefore, adapted to tilt an empty bottle with its nipple in raised position. An added feature adapted to prevent the catching or pinching of the baby's fingers at the hinge, is the collar 11 which may be of soft rubber and which surrounds the hinge. This collar 11 is of less depth in front of the hinge than it is behind the hinge. Accordingly, when the charged bottle is tipped forward, the collar 11 offers no resistance to the maintenance of this position, whereas when the baby releases the bottle and the cradle with the empty bottle in place tips back, the greater depth of the collar 11 acts as a brake to prevent it from striking too forcefully against the rest 7. In this latter case the back portion of the collar 11 is shown in Fig. I as being somewhat folded under the cradle. This action of the collar 11 is supplemented by the buffer action of the bead 8.

The "cradle" or holder element may with advantage be formed of hard rubber with a coating of soft rubber vulcanized thereto. This construction is desirable in order that the springy quality of the hard rubber may be availed of to provide a snap or grip on the shoulder of the bottle while at the same time providing a soft exterior surface to avoid pinching or injuring the baby's fingers.

While the bottle holder has been described with reference to use for babies' bottles, it will be obvious that it may be adapted for use with other bottles without departing from the principle of the invention.

It will be understood, of course, that the formulas prescribed for infants generally provide for less than a completely filled bottle. Thus, for a very young infant a four ounce bottle may be used, but the charge of milk in said bottle may be only three ounces. Accordingly, the bottle holding element 2 should be so balanced on the hinge formed by the lug 9 and the ears 10 that a small quantity of the charge will be sufficient to maintain it in the forward position when it is so tilted manually.

Having thus described my invention, what I claim is:

1. A bottle holder comprising a support, a holder element loosely pivoted on said support, the pivot being so positioned in relation to the length of said holder element that an empty bottle placed in said holder element assumes a backward tipped position with the neck upward and being adapted and arranged to maintain a forward tipped position when a charged bottle is placed in said holder and said holder is so tipped forward and a forward rest on said support to maintain said bottle in a desired forward tipped operative position, and a rear rest to maintain said bottle in a backward tipped inoperative position.

2. A bottle holder comprising a supporting element and a holder element, said holder element having a resilient forward part adapted and arranged to grip the shoulder of a bottle and having a back portion adapted and arranged to engage the bottom of said bottle, and a hinge loosely connected between said holder element and said support element and so positioned with relation to said holder element that the backward portion of said holder element outweighs the forward portion thereof and rests in front and back of said supporting element to support said holding element in a forward or backward position as desired.

3. A holder for a baby's nursing bottle comprising a holding element mounted on a supporting element by means of a loosely hinged connection adapted and arranged to assume a forward tipped position when a charged bottle is placed in said holding element, and to assume a backward tipped position when said bottle is empty and rests at the front and rear of said supporting element to maintain said holding element in said forward or backward tipped position as desired.

4. A holder for a baby's nursing bottle comprising a supporting element and a bottle holding element loosely pivoted on said supporting element, said holding element being so balanced on said pivotal mount that it cannot maintain a forward tipped position without the weight of a charged bottle placed in said holding element.

5. A bottle holder comprising a support with a forward rest conforming to a bottle shoulder and a rear rest to accommodate the back end of a bottle, said rear rest being lower than said forward rest; a holder element loosely pivoted on said support, said pivot being so positioned in relation to the length of said holder element that when an empty bottle is placed in said holder element it assumes a position resting on said rear rest with its top raised and when said bottle is charged and tipped forward on said forward rest said charged bottle assumes and maintains a forward tipped position until emptied.

6. A bottle holder comprising a support and a holder element loosely pivoted thereon, the pivot being so positioned forward of the median line thereof as to permit a nursing bottle to fall backward of its own weight unrestrained by said pivot; a forward rest upon said support and another supporting surface at the rear of said support whereby when a charged nursing bottle is tipped forward onto said forward rest, is assumes and maintains a position with the nipple presented in operative position and when said nursing bottle is emptied it falls of its own weight out of operative position.

MARY E. SWANK.